United States Patent [19]
Kaub

[11] 3,941,217
[45] Mar. 2, 1976

[54] VEHICLE BRAKE ADJUSTER
[75] Inventor: Manfred Kaub, Rhens (Rhine), Germany
[73] Assignee: Girling Limited, Birmingham, England
[22] Filed: Apr. 3, 1974
[21] Appl. No.: 457,487

[30] Foreign Application Priority Data
Apr. 3, 1973 United Kingdom............... 15885/73

[52] U.S. Cl.................. 188/79.5 GT; 188/196 BA
[51] Int. Cl.²......................................... F16D 65/56
[58] Field of Search ... 188/79.5 B, 79.5 P, 79.5 GE, 188/79.5 GT, 196 BA

[56] References Cited
UNITED STATES PATENTS

| | | | |
|---|---|---|---|
| 2,292,017 | 8/1942 | Smith | 188/79.5 B |
| 2,570,398 | 10/1951 | Smith | 188/79.5 B |
| 3,794,145 | 2/1974 | Margetts | 188/79.5 P |

Primary Examiner—Duane A. Reger
Attorney, Agent, or Firm—Scrivener Parker Scrivener and Clarke

[57] ABSTRACT

A vehicle wheel internal shoe drum brake has a pair of opposed brake shoes, an actuator acting between one pair of adjacent ends of the shoes and a two-part adjustable strut for adjusting the positions of the shoes relative to each other to compensate for wear. The strut has an elongate non-rotatable part coupled to one of the brake shoes and a rotatable part, preferably a nut member, in screw-threaded engagement with the non-rotatable part and directly engaging the other brake shoe.

1 Claim, 2 Drawing Figures

VEHICLE BRAKE ADJUSTER

This invention relates to internal shoe drum brakes.

Drum brakes are known which have an adjuster for increasing the minimum spacing between the brake shoes, either manually or automatically, to compensate for wear of the shoe friction linings. It has been proposed that the adjuster comprises an adjustable length strut connected between the shoes and having three parts, two non-rotatable parts connected to respective shoes and a third rotatable part coupled to the two non-rotatable parts, rotation of the rotatable part moving the non-rotatable parts axially relative to each other to adjust the length of the strut.

In accordance with the invention there is provided an internal shoe drum brake comprising first and second arcuate brake shoes mounted on a back plate, actuating means arranged between one pair of adjacent shoe ends to move the shoes apart and apply the brake, and an adjustable strut extending between the shoes for adjusting the positions of the shoes relative to each other, the strut having an elongated nonrotatable part coupled to the first brake shoe and a rotatable part screw-threadedly connected to a screw threaded portion of the non-rotatable part, wherein the rotatable part directly engages the second brake shoe.

By rotating the rotatable part relative to the non-rotatable part the effective length of the strut i.e. the length between the shoes, can be varied to adjust the relative positions of the shoes, for such purposes as to set the brakes on assembly or to compensate for wear of the shoe friction linings.

In a presently preferred embodiment, the rotatable part is in the form of a nut member having ratchet teeth, preferably of helical form around its periphery for engagement by a resilient pawl member. In this embodiment relative movement occurs between the pawl member and ratchet during shoe expansion or retraction, and if the movement of the shoes during expansion is sufficient, the pawl member picks up a new tooth upon retraction of the shoes.

Preferably the pawl is constituted by one arm of a torsion spring which is preferably mounted on said other shoe which is engaged by the rotatable second part of the strut.

An internal shoe drum brake in accordance with the invention for a vehicle wheel will now be described, by way of example with reference to the accompanying drawings, in which.

Figure 1:
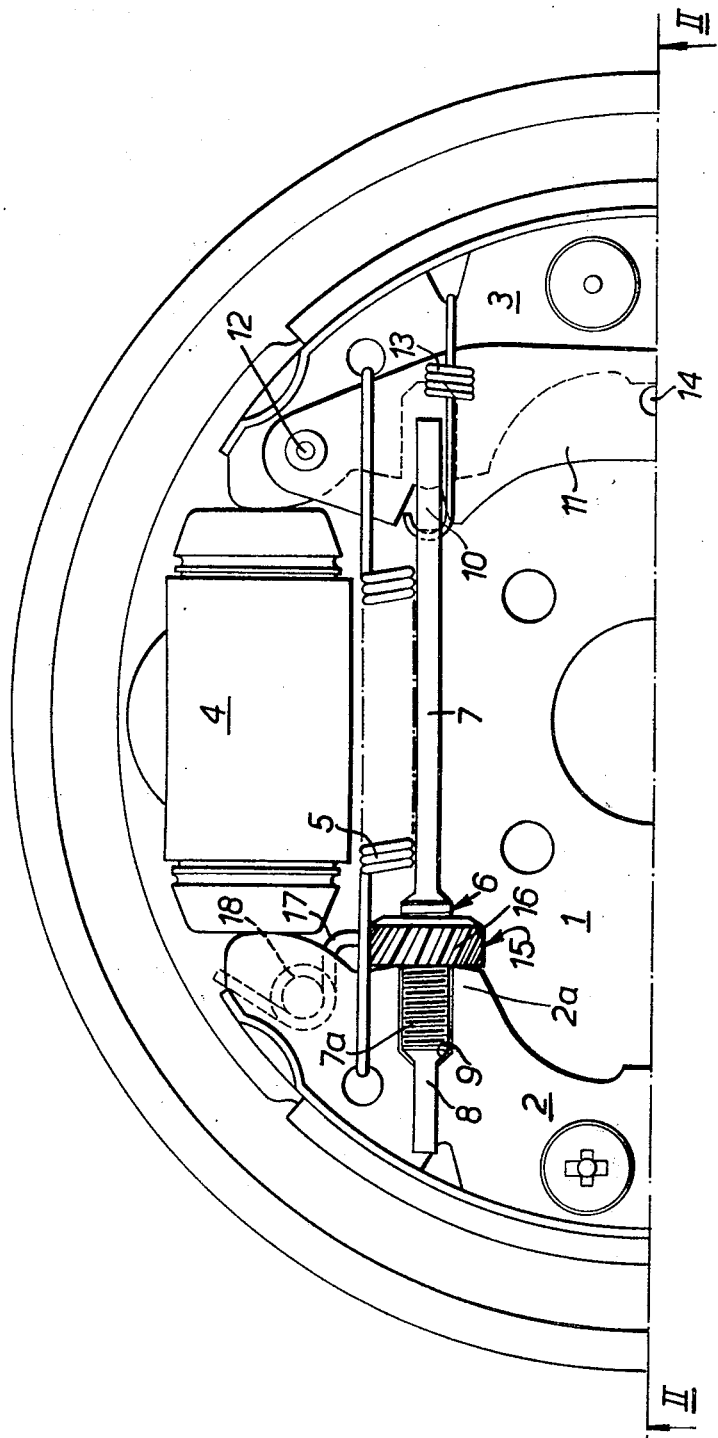
FIG. 1 is a plan view of part of the brake.
Figure 2:
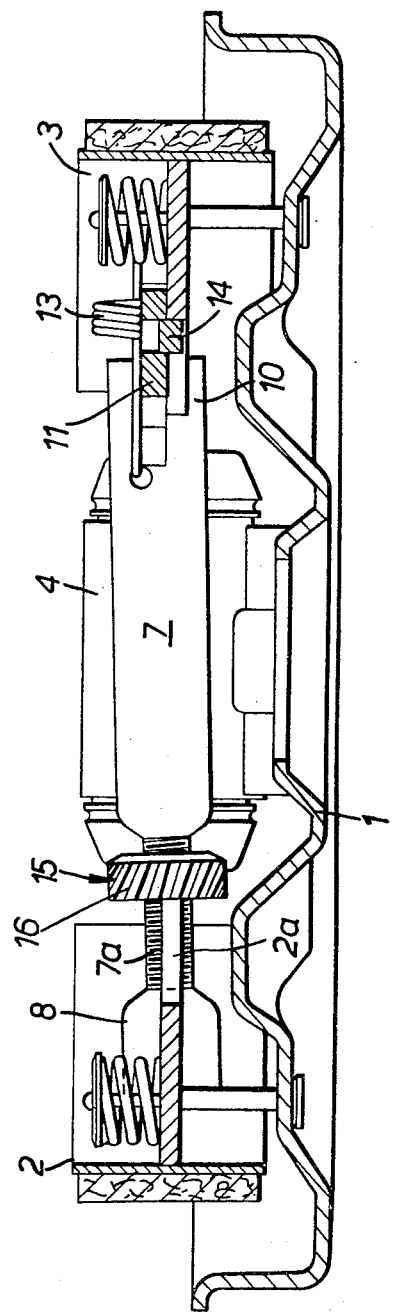
FIG. 2 is a section taken along line II-II of FIG. 1.

The brake comprises a fixed back plate 1 on which a pair of arcuate brake shoes 2 and 3 are movably mounted, adjacent tips at one end of the shoes engaging an actuator 4 which is operable to move the shoes apart against the bias of the shoe return springs 5 (only one of which is shown).

An adjuster two-part strut has an elongated non-rotatable strut part 7 extending between the shoes. The ends of the strut part are bifurcated, one end 8 co-operating with a slot 9 in the shoe 2 and the other end 10 engaging a handbrake lever 11 pivotally mounted on the shoes 3 at 12. A tension spring 13 acting between the shoe 3 and the strut part 7 biases the strut part and the handbrake lever 11 towards the shoe 3, movement being limited by the engagement of a stop 14 on the lever 11 with the web of shoe 3. The strut part 7 has a threaded portion 7a intermediate its ends on which is screwed the other strut part in the form of a nut or wheel 15 on which directly engages a protruding portion 2a on the web of shoe 2. The wheel 15 has a peripheral helical arrangement of teeth 16 one of which is engaged by a pawl 17 constituted by an arm of a torsion spring 18 mounted on the shoe 2 with its axis parallel with the wheel axis.

In operation the actuator 4 urges the shoes apart and the strut part 7 and lever 11 follows the movement of shoe 3 due to the bias of spring 13, and the pawl 17 moves in the opposite direction due to movement of the shoe 2. The resultant relative movement between the pawl 17 and the wheel 15 axially of the wheel causes rotation of the wheel so that the effective length of the adjuster 6, i.e. the length between the points of engagement of the strut part 7 with the lever 11 and the wheel 15 with the shoe 2, is increased by an amount dependent upon the wear of the shoe friction linings. If the wear is sufficient the pawl 17 picks up a new tooth when the shoes retract and adjustment is effected on the next successive operation of the actuator 4.

It will be appreciated that the handbrake lever 11 is not essential and that the strut part 7 may directly engage the web of shoe 3. Further, the torsion spring could be mounted on the fixed back plate 1, but in this case only movement of shoe 3 would be sensed, and not the movement of both shoes as in the above-described arrangement.

Provision could be made for manual adjustment of the strut, for example by having an aperture in the backplate to permit access to the wheel 15 by a suitable tool to manually rotate the wheel.

I claim:

1. A vehicle wheel internal shoe drum brake comprising a fixed back plate; first and second opposed arcuate brake shoes mounted on said back plate; shoe return spring means biasing said shoes towards each other; actuating means acting between one pair of adjacent shoe ends to move said shoes apart against the bias of said shoe return spring means and apply the brake; a handbrake lever pivotally mounted on said first shoe; an elongate two-part reaction strut having a non-rotatable part which engages said lever, and a rotatable part in the form of a nut member in screw-threaded engagement with said non-rotatable part and directly engaging said second shoe, whereby movement of said lever is transmitted through said strut to said second shoe, said nut member having ratchet teeth of helical form on its periphery; spring means biasing said strut into engagement with said lever and towards said first shoe; and a coil torsion spring mounted on said second shoe with its axis parallel with the wheel axis; said torsion spring having two opposed end portions, one said end portion engaging said second shoe and the other said end portion constituting a pawl biased towards and engaging the periphery of said nut member.

* * * * *